United States Patent Office 3,356,494
Patented Dec. 5, 1967

3,356,494
FLUXLESS ALUMINUM BRAZING ALLOYS
Nikolajs Bredzs, Chicago, Ill., assignor, by mesne assignments, to Reynolds Metals Company, Richmond, Va., a corporation of Delaware
No Drawing. Filed Dec. 23, 1964, Ser. No. 420,816
11 Claims. (Cl. 75—141)

ABSTRACT OF THE DISCLOSURE

A fluxless brazing alloy consisting essentially of magnesium (about 4.5 to 10.5% by weight), aluminum (about 63 to 78.5%), balance at least one of the metals copper and zinc, the alloy having a melting range such as to be effective for brazing at about 450–500° C.

---

This invention relates to the fluxless brazing of aluminum and aluminum alloys. More particularly, the invention concerns a novel method for the fluxless brazing of aluminum, and novel aluminum alloy filler metal compositions suitable therefor.

In the conventional brazing of aluminum, the natural aluminum oxide coating of the metal makes it necessary to use a flux which will melt below the brazing temperature and prepare the surfaces so the filler metal can flow into the joint. The brazing fluxes are usually alkali metal halides and have the disadvantage that they and their residues are hygroscopic and corrosive to the brazed joints. Hence efforts have been made prior to the present invention to avoid the necessity of using fluxes by providing filler alloys which would be self-fluxing. One such type of brazing alloy is disclosed in U.S. Patent 3,081,534, and is an alloy of aluminum, silicon and lithium, with optional addition of copper. A fluxless solder for aluminum containing a 2–5% copper, 4–7% aluminum, and remainder zinc, is disclosed in U.S. Patent 2,907,105, dated October 6, 1959, now withdrawn.

In conventional flux-brazing of aluminum and its alloys there are employed alloys of aluminum and silicon, which contain from about 7.5% to 12.5% silicon, and which melt between about 1060° F. and 1180° F. The brazing temperatures are usually in the neighborhood of 1100° F., or about 100° F. below the melting temperature of the material being brazed. At these temperatures annealing of the aluminum alloys takes place, making it necessary to employ rapid local heating to confine the annealing effect to a small area. Accordingly, it has long been sought to find brazing alloys which would not only be fluxless, but which could be used at considerably lower brazing temperatures than heretofore.

In accordance with the invention, it has been found that certain comparatively low melting aluminum alloys when the molten state and in contact with the surfaces of aluminum or aluminum alloys, are capable of diffusing along the aluminum-aluminum oxide interface, disintegrating and disrupting the aluminum oxide film on the metal surfaces and dissolving the aluminum base metal to which the molten alloys are applied. This disruptive effect is believed to be one in which oxide skin penetration by the liquid alloy occurs through a kind of capillary action, resulting a lifting and detachment of the oxide film. The low melting temperatures of the filler alloys of the invention, together with their penetrative effect when molten, their ability to dissolve the base metal of the members to be joined, and the absence of corrosive effects, makes them especially adapted for the fluxless brazing of aluminum.

Aluminum alloys which are capable of thus diffusing along the aluminum-aluminum oxide interface include certain binary alloys of aluminum and magnesium as well as certain ternary and quaternary alloys of aluminum and magnesium which further includes one or more temperature depressant elements. These alloys may be applied in conjunction with the conventional methods for brazing aluminum and aluminum alloys, including torch, furnace, induction and resistance brazing methods.

In accordance with the invention, the alloys of aluminum and magnesium which possess self-fluxing properties, are those in which the proportion of Al to Mg in the (Al–Mg) alloy varies from about 10 to 90 parts by weight of aluminum to from about 90 to 10 parts by weight of magnesium. An examination of the available binary phase diagrams reveals that the lowest melting eutectic is, the amounts being percent by weight:

32 Al-68 Mg, M.P. 437° C.

In the preparation of the (Al–Mg) and other self-fluxing alloys utilized in the practice of the invention, the pure metals may be melted in selected proportions in a suitable furnace, such as an induction furnace, under a dry inert atmosphere, such as, for example, helium. Each of the resulting alloys is brittle enough to be capable of being crushed to a fine powder. The resulting powdered alloys are then precompacted under a pressure ranging from about 60,000 to 100,000 p.s.i. into discs of suitable diameter and thickness, as, for example, diameter 0.75 inch, and thickness from about 1/32 to 1/16 inch.

Observation has shown that the (Al–Mg) and other alloys wet and flow readily over the surfaces of aluminum alloys to be brazed, such as, for example 1100 aluminum alloy. The molten brazing alloys diffuse along the aluminum base metal-aluminum oxide interface surrounding the molten filler alloy disc.

The average particle size of the crushed self-fluxing alloys is of importance, for, if they are too coarse, their diffusion is inhibited, while if they are too fine, they are more difficult to prepare and preserve because of their tendency to oxidize. For most of the alloys employed, a suitable range of particle size is from about 65 mesh to 220 mesh, preferably about 200 mesh. In some cases, fine filings (approximately 0.02 inch in length) may be used.

In addition to the aforementioned eutectic, other examples of (Al–Mg) self-fluxing alloys which may be employed in accordance with the method of the invention include:

(1) 50 wt. percent Al-50 wt. percent Mg, M.P. 460° C.
(2) 75 wt. percent Al-25 wt. percent Mg, solidus temp. 450° C.
(3) 87.5 wt. percent Al-12.5 wt. percent Mg, solidus temp. 490° C.
(4) 90 wt. percent Al-10 wt. percent Mg, solidus temp. 515° C.

In accordance with another aspect of the invention, self-fluxing (Al–Mg) alloys may be employed in which the proportion of Mg is less than 10%. However, the reduction in magnesium content substantially below 10% by weight raises the melting temperature of the binary (Al–Mg) alloy to a point approaching the melting temperature of aluminum itself (660° C.), thus minimizing the self-fluxing and diffusing action. Hence, in accordance with the invention, where the amount of magnesium is less than about 10%, at least one additional melting temperature depressant element may be incorporated into the Al–Mg alloy. Such additional elements include, for example, copper, zinc, or both copper and zinc. These ternary and quaternary alloys can be prepared by adding small amounts of magnesium to low melting binary and ternary alloys of aluminum with copper and/or zinc. The resulting filler metals must, however, themselves be low melting and possess self-fluxing and film disruptive properties. Their solidus temperatures should be of the order of about 450° to 500° C. to obtain good results.

A low melting ternary Al–Cu–Mg alloy may be prepared by adding 7.6% by weight of Mg to the lowest melting eutectic in the binary Al–Cu system, namely 67 wt. percent Al–33 wt. percent Cu, and reducing the resulting ternary alloy to powdered form. The ternary alloy has the composition 64.3 wt. percent Al-28.6 wt. percent Cu-7.1 wt. percent Mg. Similarly, there is prepared a ternary alloy having the composition 68.2 wt. percent Al-27.3 wt. percent Cu-4.5 wt. percent Mg.

A ternary self-fluxing Al–Zn–Mg alloy is prepared by adding 12.0 wt. percent of Mg to the low-melting 70Al-30Zn alloy (solidus temperature 530° C.). The resulting low-melting alloy has the composition 63.0 wt. percent Al-26.5 wt. percent Zn-10.5 wt. percent Mg.

Similarly, there is prepared a self-fluxing quaternary Al–Mg–Cu–Zn alloy of low melting characteristics having the composition 78.5 wt. percent Al-5 wt. percent Mg-5 wt. percent Cu-11.5 wt. percent Zn.

As indicated previously, the fluxless brazing alloys employed in the practice of the invention may be applied in connection with the conventional methods for brazing aluminum and aluminum alloys, including torch, furnace, induction, and resistance brazing methods. In order to illustrate the practice of the invention, methods of torch brazing will be described, but it is to be understood that the invention is not to be regarded as limited thereto.

The various powdered filler metal alloys previously described were precompacted under a pressure of 60,000 p.s.i. to form discs or shims having a diameter of about 0.75 inch and having a thickness between 1/16 and 1/32 inch.

The aluminum alloy selected for brazing tests was No. 1100 alloy, in the form of strips having the dimensions 4 x 1 x 1/8 inches. The surfaces were prepared prior to brazing by hand scrubbing with a brass wire brush and degreasing in trichloroethylene vapor. The flat ends of the 1100 aluminum alloy strips were torch brazed in air without the use of fluxes or protective atmospheres, using an oxy-acetylene flame, and using the disc preplaced between the overlapping ends of a pair of strips, while C-clamps were used to press the faying surfaces together during brazing.

The following table shows average and maximum shear strengths obtained in tests on 1100 aluminum alloy strips employing the filler alloys previously described:

TABLE 1

| Brazing Alloy, Percent by weight | Shear Strength, p.s.i. | |
|---|---|---|
| | Average | Maximum |
| 50 Al-50 Mg | 641 | 860 |
| 75 Al-25 Mg | 973 | 1,290 |
| 87.5 Al-12.5 Mg | 1,580 | 1,652 |
| 90 Al-10 Mg | 883 | 1,041 |
| 63.0 Al-26.5 Zn-10-5 Mg | 1,947 | 2,218 |
| 64.3 Al-28.6 Cu-7.1 Mg | 2,912 | 3,124 |
| 68.2 Al-27.3 Cu-4.5 Mg | 2,422 | 2,445 |
| 78.5 Al-11.5 Zn-5 Cu-5 Mg | 2,143 | 2,218 |

Metallographic investigation of the cross-sectioned joints revealed extensive alloying of the base metal with the filler metal on both sides of the filler metal layer. The amount of alloying, i.e. the thickness of the alloy layers on both sides of the filler metal layer, decreases as the magnesium content decreases. Joints brazed with the 64.3 Al-28.6 Cu-7.1 Mg alloy yielded the highest average shear strength.

What is claimed is:

1. A fluxless brazing alloy for aluminum consisting essentially of 63 weight percent of aluminum, 26.5 weight percent of zinc and 10.5 weight percent of magnesium, said alloy having a melting range such as to be effective for brazing at a temperature in the range from about 450° C. to about 500° C.

2. A fluxless brazing alloy for aluminum consisting essentially of 64.3 weight percent of aluminum, 28.6 weight percent of copper and 7.1 weight percent of magnesium, said alloy having a melting range such as to be effective for brazing at a temperature in the range from about 450° C. to about 500° C.

3. A fluxless brazing alloy for aluminum consisting essentially of 68.2 weight percent of aluminum, 27.3 weight percent of copper and 4.5 weight percent of magnesium, said alloy having a melting range such as to be effective for brazing at a temperature in the range from about 450° C. to about 500° C.

4. A fluxless brazing alloy for aluminum consisting essentially of 78.5 weight percent of aluminum, 11.5 weight percent of zinc, 5 weight percent of copper and 5 weight percent of magnesium, said alloy having a melting range such as to be effective for brazing at a temperature in the range from about 450° C. to about 500° C.

5. A fluxless brazing alloy for aluminum consisting essentially of from about 63 to about 78.5 weight percent of aluminum and from about 4.5 to about 10.5 weight percent of magnesium, the balance at least one melting temperature depressant metal selected from the group consisting of copper and zinc, said alloy having a melting range such as to be effective for brazing at a temperature in the range from about 450° C. to about 500° C.

6. An alloy according to claim 5, in which said temperature depressant metal is copper.

7. An alloy according to claim 6, in which the weight proportions of aluminum and copper are about 67:33.

8. An alloy according to claim 6, containing about 7.1% magnesium.

9. An alloy according to claim 5, in which said temperature depressant metal is zinc.

10. An alloy according to claim 9, in which the weight proportions of aluminum and zinc are about 70:30.

11. An alloy according to claim 9 containing about 10.5% magnesium.

References Cited

UNITED STATES PATENTS

| 2,249,740 | 7/1941 | Bonsack | 75—147 |
| 2,280,175 | 4/1942 | Stroup | 75—142 |
| 2,336,512 | 12/1943 | Stroup | 75—147 |

DAVID L. RECK, *Primary Examiner.*

RICHARD O. DEAN, *Assistant Examiner.*